UNITED STATES PATENT OFFICE.

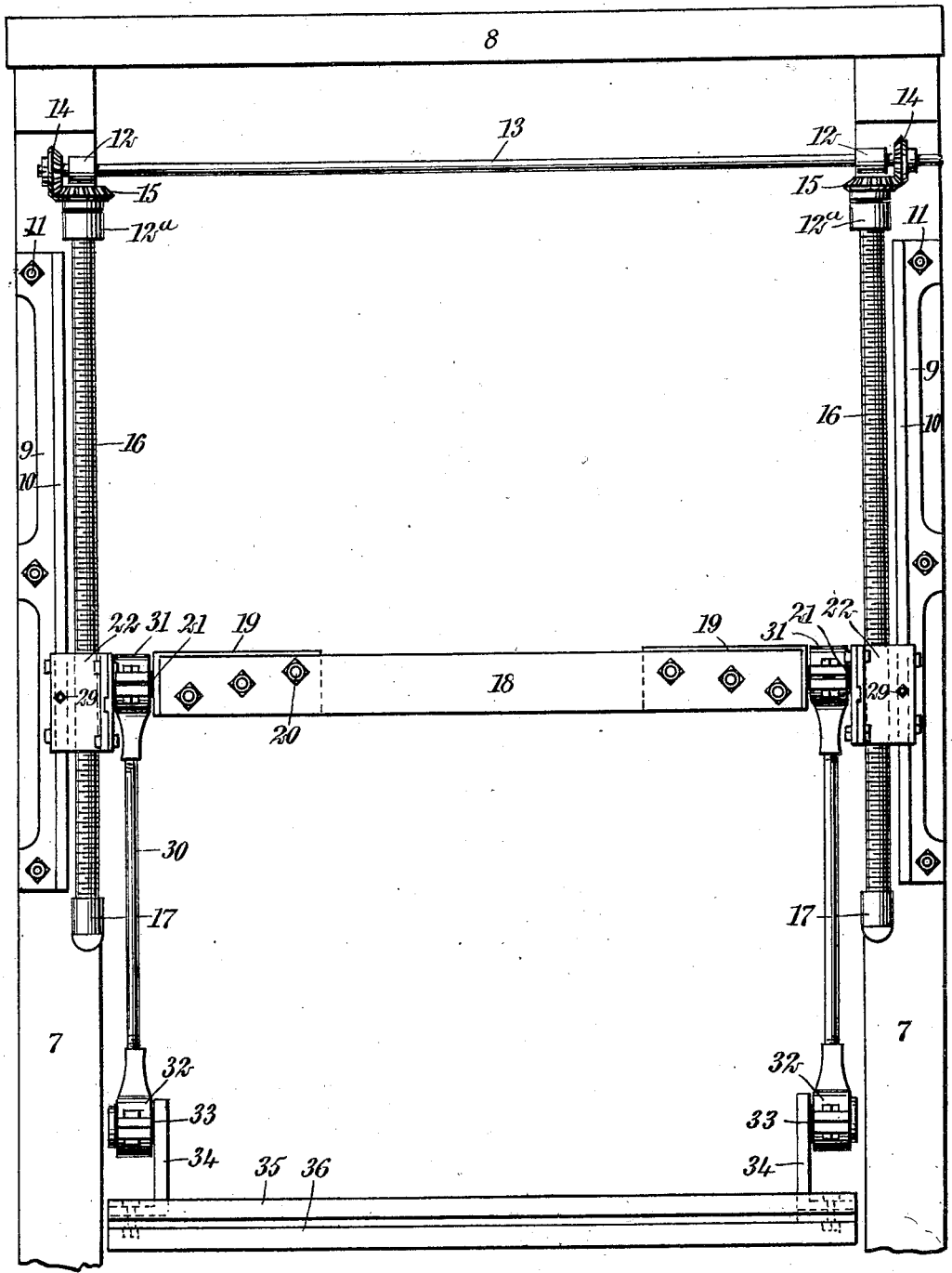

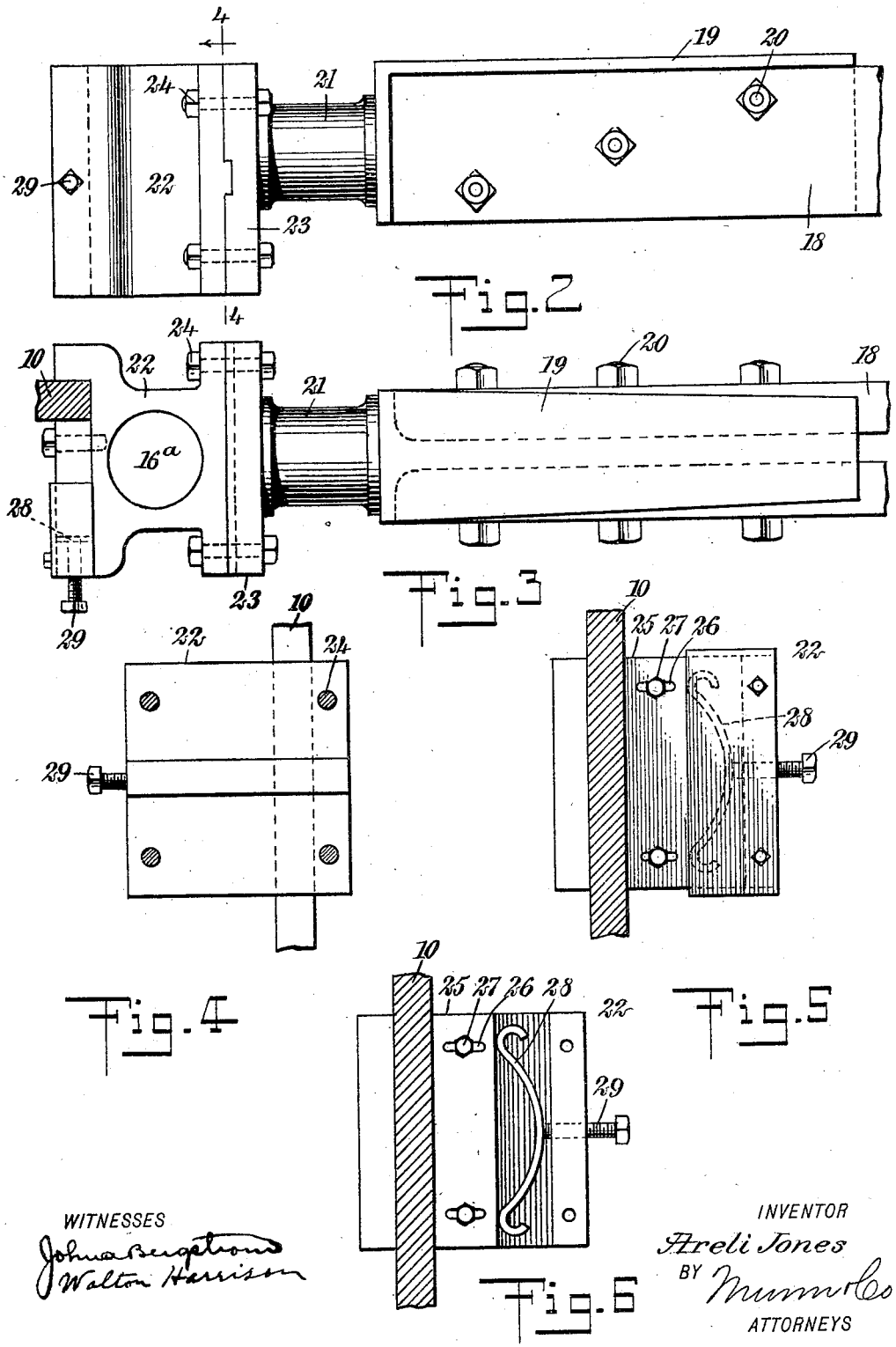

ARELI JONES, OF OOLITIC, INDIANA.

MOUNTING FOR GANG-SAWS.

No. 922,283.  Specification of Letters Patent.  Patented May 18, 1909.

Application filed March 17, 1908. Serial No. 421,706.

*To all whom it may concern:*

Be it known that I, ARELI JONES, a citizen of the United States, and a resident of Oolitic, in the county of Lawrence and State of Indiana, have invented a new and Improved Mounting for Gang-Saws, of which the following is a full, clear, and exact description.

My invention relates to mountings for gang saws, my more particular object being to produce certain improvements in hanger arms for supporting the saw and in parts associated with this hanger arm, in order to improve the general efficiency and safety of the gang saw while in action.

Reference is to be had to the accompanying drawings forming a part of this specification, in which similar characters of reference indicate corresponding parts in all the figures.

Figure 1 is an end elevation of the gang frame upon which is mounted the adjustable hanger arm, and depending from this are the hanger rods provided at their bottoms with bearings carrying the swinging wrists, the latter in turn supporting the means for holding the saws; Fig. 2 is an enlarged side elevation of the adjustable slide supporting the hanger arm and its accompanying parts; Fig. 3 is a plan view, partly in section, showing mechanism disclosed in Fig. 2; Fig. 4 is a section upon the line 4—4 of Fig. 2, looking in the direction of the arrow, and showing one face of the boxing used in connection with the ends of the hanger arms, this boxing being adjustable relatively to the stationary framework; Fig. 5 is a section through the boxing last mentioned, and shows a spring for neatly fitting the boxing relatively to the framework, and also a screw for adjusting the tension of the spring; and Fig. 6 is a view somewhat similar to Fig. 5, but showing the spring in elevation.

Mounted upon posts 7 is a cross beam 8, and supported upon these posts are metal plates 9, each provided with a track 10 integral with it and projecting slightly therefrom, the plates being held rigidly upon the posts by aid of bolts 11. Bearings 12 are mounted upon the posts 7 and supported by these bearings is a revoluble shaft 13. Bevel gears 14 are mounted rigidly upon this shaft and mesh with bevel gears 15, the latter being rigidly mounted upon the screws 16. The upper ends of the screws 16 are encircled by annular bearings $12^a$, the lower ends of the screws being revolubly mounted in bearings 17. The bearings $12^a$ and 17 are rigid upon the posts 7.

A hanger arm is shown at 18 and is provided adjacent to its ends with plates 19 secured rigidly in relation to it by aid of bolts 20. The plates 19 have generally the form shown in Figs. 2 and 3 and are provided with necks 21 secured to boxes 22, the latter working upon the threads of the screws 16 and being adjustable, so as to slide, by rotation of these screws. Each box 22 is provided with a threaded opening $16^a$ through which the screw 16 passes, and is also provided with a face 23 secured to it by aid of bolts 24.

Mounted within each box 22 is a plate 25 provided with slots 26, and extending through these slots are bolts 27. Pressing upon each plate 25 is a double ended leaf-spring 28, and bearing upon this leaf-spring is an adjusting screw 29. By turning this screw the tension of the leaf-spring 28, relatively to the plate 25, may be controlled at will, and the pressure of the plate 25 against the track 10 may thus be governed as desired. As the plate 25 is always pressed toward the track 10, any wear either upon the plate or upon the track is compensated for in such manner that no lost motion is likely to develop. Moreover, by adjusting the screws 29 any tendency to lost motion can still further be avoided.

Journaled upon the necks 21 are hanger rods 30, the upper ends of which are connected with annular bearings 31 for this purpose. The lower ends of the hanger rods 30 carry bearings 32. Journaled within these bearings are necks 33 which are mounted rigidly upon brackets 34. These brackets carry two bars 35, 36 spaced apart, as shown, and used for supporting the ends of the gang saws. The manner of connecting these saws with the members 35, 36, being old and well known, I will not describe it.

Generally speaking, the device above described is employed in connection with gang saws of the type used for cutting ashlers and other heavy stones. The mechanism, however, may be employed in other relations, as desired.

The operation of my device is as follows: The parts being in position, the shaft 13 is turned in any appropriate manner, so as to cause rotation of the screws 16. This raises or lowers the boxes 22 and hanger arm 18, together with the various parts depending from the latter and including the gang saws. Power being applied in the usual manner, the hanger rods 30, together with parts supported by them, begin to swing, and the saws begin their reciprocating motion.

It will be noted that there are two journals intermediate the hanger arm 18 and the bars 35, 36. That is to say, the hanger rods 30 are journaled relatively to the hanger arm 18, and the bars 35, 36 and brackets 34 are also journaled relatively to the hanger arm. This double jointing gives the bars 35, 36 considerable freedom in their swinging movement and enables them to accommodate themselves to irregularities of motion. This tends to prevent the breaking or injury of the saws or any of the moving parts, and has also a marked tendency to prevent accidents to operatives.

Having thus described my invention, I claim as new and desire to secure by Letters Patent:

1. The combination of a stationary framework provided with tracks, revoluble screws supported by said framework and disposed parallel with said tracks, boxes provided with portions engaging said screws and also with portions engaging said tracks, springs mounted within said boxes and engaging said tracks for the purpose of maintaining said boxes in predetermined positions relatively to said tracks so as to compensate for wear, and mechanism controllable at will for adjusting the tension of said spring.

2. The combination of a stationary framework provided with tracks, revoluble screws supported by said stationary framework and disposed parallel with said tracks, boxes engaging said screws and adapted to be raised and lowered thereby, springs mounted within said boxes and engaging said tracks for the purpose of maintaining said boxes in a predetermined working relation to said tracks in order to compensate for wear, means for regulating the tension of the springs, a hanger arm supported upon said boxes, and mechanism connected with said hanger arm for supporting saws.

In testimony whereof I have signed my name to this specification in the presence of two subscribing witnesses.

ARELI JONES.

Witnesses:
　SYLVANUS JACKSON,
　CHARLES WM. GOBAT.